United States Patent
Schemmann et al.

(10) Patent No.: US 7,433,598 B2
(45) Date of Patent: Oct. 7, 2008

(54) UNCOOLED LASER GENERATION OF NARROWCAST CATV SIGNAL

(75) Inventors: Marcel F. C. Schemmann, Echt (NL); Venkatesh G. Mutalik, Manlius, NY (US)

(73) Assignee: Broadband Royalty Corp., Wilmington, DE (US)

( * ) Notice: Subject to any disclaimer, the term of this patent is extended or adjusted under 35 U.S.C. 154(b) by 890 days.

(21) Appl. No.: 09/896,547

(22) Filed: Jun. 29, 2001

(65) Prior Publication Data

US 2003/0005467 A1 Jan. 2, 2003

(51) Int. Cl.
*H04J 14/00* (2006.01)

(52) U.S. Cl. .............................. 398/66; 398/68; 398/70

(58) Field of Classification Search ................... 398/66, 398/68, 69, 70, 71
See application file for complete search history.

(56) References Cited

U.S. PATENT DOCUMENTS

| | | | | |
|---|---|---|---|---|
| 5,153,763 A * | 10/1992 | Pidgeon | ........................ | 398/71 |
| 5,204,767 A * | 4/1993 | Nakata et al. | .................. | 398/71 |
| 5,361,156 A * | 11/1994 | Pidgeon | ....................... | 398/193 |
| 5,412,415 A * | 5/1995 | Cook et al. | .................. | 725/144 |
| 5,430,568 A * | 7/1995 | Little et al. | .................... | 398/79 |
| 5,436,749 A | 7/1995 | Pidgeon, Jr. et al. | | |
| 5,528,582 A | 6/1996 | Bodeep et al. | | |
| 5,559,624 A * | 9/1996 | Darcie et al. | ................... | 398/72 |
| 5,748,348 A * | 5/1998 | Heidemann et al. | ............ | 398/68 |
| 5,880,865 A * | 3/1999 | Lu et al. | ........................ | 398/72 |
| 5,959,658 A * | 9/1999 | Gnauck et al. | ............... | 725/151 |
| 6,055,278 A * | 4/2000 | Ho et al. | ...................... | 375/296 |
| 6,226,114 B1 | 5/2001 | Ashkeboussi et al. | | |
| 6,253,375 B1 | 6/2001 | Gordon et al. | | |
| 6,433,903 B1 * | 8/2002 | Barry et al. | .................... | 398/79 |
| 6,618,407 B1 * | 9/2003 | Andrews et al. | ......... | 372/38.02 |

FOREIGN PATENT DOCUMENTS

EP       0 695 092       1/1996

(Continued)

OTHER PUBLICATIONS

D. T. Gall, Nanostructures and Quantum DOTS/WDM Components/VCSELS, XP-010352591, pp. 29-30, "HFC Networks; Technical and Business Consequences of the Variations", Jul. 26, 1999.

(Continued)

*Primary Examiner*—Dalzid Singh
(74) *Attorney, Agent, or Firm*—FSP LLC

(57) ABSTRACT

A cable television (CATV) distribution system, and a method of forming and using the CATV distribution system. In a first embodiment, a narrowcast optical signal is generated by an uncooled laser and converted by a receiver into a narrowcast electrical signal. In a second embodiment, a narrowcast optical signal generated by an uncooled laser is combined with a broadcast optical signal by an optical coupler at a hub of the CATV distribution system to generate a composite optical signal, which at a CATV node is: split into the broadcast and narrowcast optical components, respectively converted into broadcast and narrowcast electrical components, and combined into a composite electrical signal. In a third embodiment, a narrowcast optical signal is generated by an uncooled laser and then combined with the broadcast optical signal by a single receiver.

8 Claims, 6 Drawing Sheets

FOREIGN PATENT DOCUMENTS

| | | |
|---|---|---|
| EP | 0 991 217 | 4/2000 |
| WO | WO 00/64087 | 10/2000 |
| WO | WO 00/72481 | 11/2000 |
| WO | WO 00/72481 A1 | 11/2000 |

OTHER PUBLICATIONS

M. R. Phillips et al., 112 Channel Split-Band WDM Lightwave CATV System, IEEE Photonics Technology Letters, vol. 4, No. 7, Jul. 1992.

* cited by examiner

UNCOOLED LASER GENERATION OF NARROWCAST CATV SIGNAL

BACKGROUND OF THE INVENTION

1. Technical Field

The present invention relates to narrowcast signals, and method of generation and usage thereof, within a cable television (CATV) distribution system.

2. Related Art

A cable television (CATV) distribution system transmits a broadcast signal and a narrowcast signal. While the broadcast signal in intended to be transmitted to all end users, the narrowcast signal is intended to be selectively transmitted to a narrow group of end users. The broadcast signal is transmitted from a headend to a hub. The narrowcast signal is generated within the hub. A transmitter at the hub transmits to a CATV node the narrowcast signal combined with the broadcast signal. Unfortunately, the transmitter at the hub is expensive. Additionally, it is costly to generate the narrowcast signal. Accordingly, there to a need to reduce costs associated with narrowcast signal generation and transmission within a hub of a CATV distribution system.

SUMMARY OF THE INVENTION

The present invention provides a cable television (CATV) distribution system, comprising an uncooled laser adapted to generate a narrowcast optical signal.

The present invention provides a cable TV (CATV) distribution system, comprising:

an uncooled laser adapted to generate a narrowcast optical signal; and an optical coupler at a hub, wherein the optical coupler is adapted to receive both a broadcast optical signal and the narrowcast optical signal, and further adapted to combine the narrowcast optical signal with the broadcast optical signal to generate a composite optical signal.

The present invention provides a method of forming a cable television (CATV) distribution system, comprising providing an uncooled laser adapted to generate a narrowcast optical signal.

The present invention provides a method of forming a cable TV (CATV) distribution system, comprising:

providing an uncooled laser adapted to generate a narrowcast optical signal; and providing an optical coupler at a hub, wherein the optical coupler is adapted to receive both a broadcast optical signal and the narrowcast optical signal, and further adapted to combine the narrowcast optical signal with the broadcast optical signal to generate a composite optical signal.

The present invention provides a method of using a cable television (CATV) distribution system, comprising generating by an uncooled laser a narrowcast optical signal.

The present invention provides a method of using a cable TV (CATV) distribution system, comprising:

generating by an uncooled laser a narrowcast optical signal having a narrowcast distortion at one or more frequencies within the narrowcast optical signal, wherein the narrowcast distortion includes at least one of second order distortion and third order distortion, and wherein the narrowcast distortion at each frequency of the one or more frequencies is within a bandwidth of a broadcast optical signal;

transforming the narrowcast optical signal into a modified narrowcast optical signal in which the narrowcast distortion has been reduced to within a noise level tolerance of the broadcast optical signal, and wherein the transforming is accomplished by a linearization circuit;

receiving by an optical coupler at a hub both the broadcast optical signal and the modified narrowcast optical signal; and generating by the optical coupler a composite optical signal by combining by the modified narrowcast optical signal with the broadcast optical signal.

The present invention reduces costs associated with narrowcast signal generation and transmission within a hub of a CATV distribution system.

DETAILED DESCRIPTION OF THE INVENTION

Figure 1:
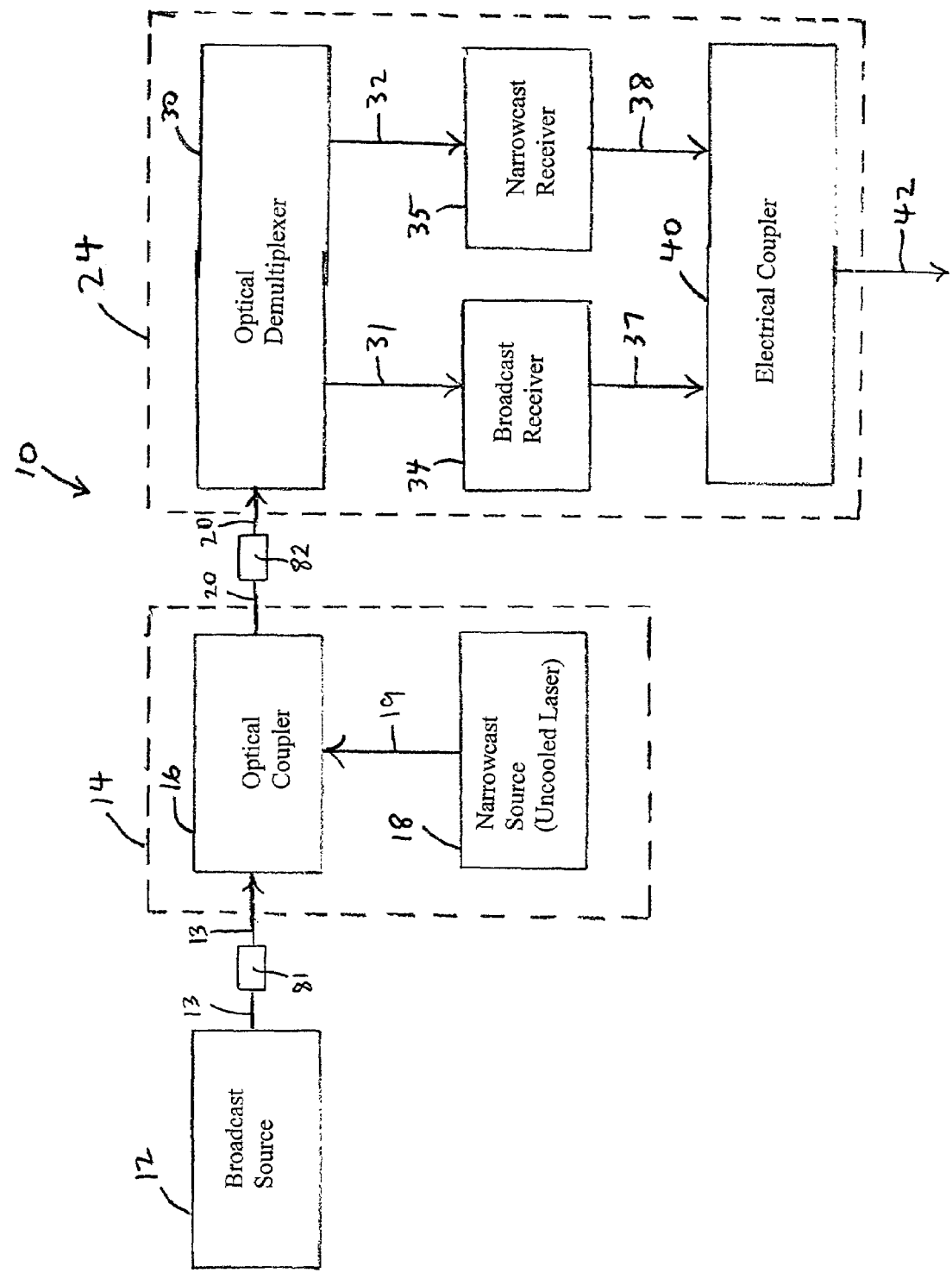
FIG. 1 is a block diagram of a cable television (CATV) distribution system that includes generation of a narrowcast signal by an uncooled laser, in accordance with embodiments of the present invention.

FIG. 1 is a block diagram of a cable television (CATV) distribution system 10, in accordance with embodiments of the present invention. The CATV distribution system 10 includes an optical coupler 16 at a CATV hub 14, wherein the optical coupler 16 combines a broadcast optical signal 13 with a narrowcast optical signal 19 to form a composite optical signal 20. The optical coupler 16 comprises any device known to one of ordinary skill in the art for combining a plurality of optical signals into a composite optical signal (e.g., a wavelength division multiplexing (WDM) device). The composite optical signal 20 is transmitted to a CATV node 24 which converts the composite optical signal 20 to a composite electrical signal 42 to be transmitted to a terminal site such as, inter alia, a set-top box. Although FIG. 1 shows one CATV hub 14, the CATV distribution system 10 may include a plurality of such CATV hubs 14. Similarly, although FIG. 1 shows one CATV node 24, the CATV distribution system 10 may include a plurality of such CATV nodes 24 coupled to each CATV hub 14.

In FIG. 1, the broadcast optical signal 13 is transmitted through an optical network 81 from a broadcast source 12 to the hub 14. The optical network 81 comprises various types of optical fibers of various lengths such as, inter alia, signal mode fiber and dispersion shifted fiber. The optical network 81 may also comprise, inter alia, erbium doped fiber amplifiers (EDFA), and semiconductor optical amplifiers (SOA), dense wavelength division multiplexer (DWDM), and other similar optical devices. The broadcast optical signal 13 is propagated at a carrier wavelength such as, inter alia, 1550 nanometers (nm), modulated over a frequency bandwidth such as, inter alia, 50 to 550 MHZ. There are alternative ways for the broadcast optical signal 13 to be generated at the broadcast source 12. As a first alternative way, the broadcast optical signal 13 may be an externally modulated signal. An example of an externally modulated signal is a laser-generated signal that passes through an external modulator which modulates the signal. As a second alternative way, the broadcast optical signal 13 may be a directly modulated signal. An example of a directly modulated signal includes modulation of the laser itself such that the laser-generated signal is modulated upon its generation. An externally modulated signal and a directly modulated signal may each be generated by a headend and transmitted to the hub 14 over optical fibers. As a third alternative way, the broadcast optical signal 13 may be directly injected into the hub 14 from a local satellite farm source without use of optical fibers for the transmission.

FIG. 1 shows a narrowcast source 18 that generates the narrowcast optical signal 19 and transmits the narrowcast optical signal 19 to the optical coupler 16, wherein the optical coupler 16 is in the hub 14. Although the narrowcast source 18 is shown in FIG. 1 as being within the hub 14, the narrowcast source 18 may be external to the hub 14 such that the narrowcast optical signal 19 is piped from an external narrowcast source 18 to the hub 14.

The narrowcast source 18 is an uncooled laser that generates the narrowcast optical signal 19 at a carrier wavelength such as, inter alia, 1310 nm, modulated over a frequency bandwidth such as, inter alia, 570 to 870 MHZ. Generally, the narrowcast optical signal 19 and the broadcast optical signal 13 have different carrier wavelengths. The uncooled laser is a laser that dissipates heat into the ambient environment without any special cooling apparatus. The uncooled laser may include, inter alia, a distributed feedback (DFB) laser or a vertical cavity surface emitting laser (VCSEL). The uncooled laser of the present invention is inexpensive and permits use of the optical coupler 16 which is also inexpensive. Thus, use of the uncooled laser substantially reduces costs in comparison with a relatively expensive transmitter at the hub 14, wherein such an expensive transmitter is conventionally used in the related art.

The composite optical signal 20 that is transmitted through an optical network 82 to the node 24 is received at an optical demultiplexer 30 at the node 24. The optical network 82 is similar to the optical network 81, described supra. The optical demultiplexer 30 splits the composite optical signal 20 into a narrowcast optical signal 32 (equivalent to the narrowcast optical signal 19) and a broadcast optical signal 31 (equivalent to the broadcast optical signal 13). The optical demultiplexer 30 comprises any device known to one of ordinary skill in the art for splitting a composite optical signal into a plurality of optical signals (e.g., a WDM device).

The node 24 further comprises a broadcast receiver 34, a narrowcast receiver 35, and an electrical coupler 40. The broadcast receiver 34 receives the broadcast optical signal 31 and converts the broadcast optical signal 31 into a broadcast electrical signal 37. The narrowcast receiver 35 receives the narrowcast optical signal 32 and converts the narrowcast optical signal 32 into a narrowcast electrical signal 38. The electrical coupler 40 combines the narrowcast electrical signal 38 with the broadcast electrical signal 37 to generate the composite electrical signal 42. The electrical coupler 40 comprises any device known to one of ordinary skill in the art for combining a plurality of electrical signals into a composite electrical signal (e.g., a combine diplex).

Figure 6:
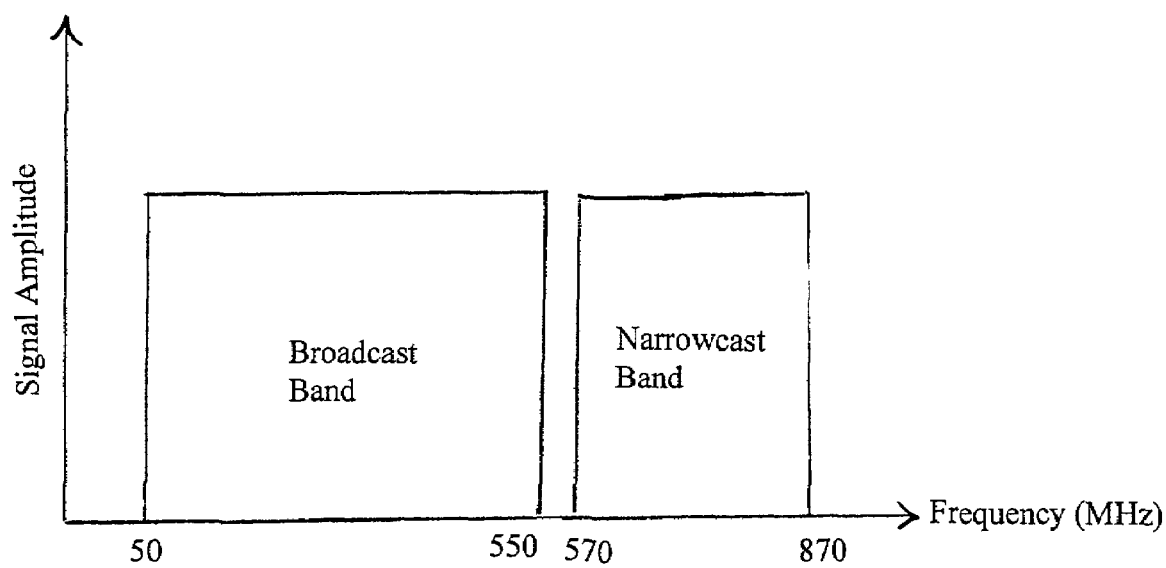
FIG. 6 depicts a representative broadcast signal frequency band and a representative narrowcast signal frequency band, in accordance with embodiments of the present invention.

FIG. 6 depicts a representative broadcast signal frequency bandwidth of 50 to 550 MHZ associated with the broadcast optical signal 13 or the equivalent broadcast optical signal 31. Other examples of broadcast signal frequency bandwidths include, inter alia, 50 to 750 MHZ, 50-1000 MHZ, etc. FIG. 6 also depicts a representative narrowcast signal frequency bandwidth of 570 to 870 MHZ associated with the narrowcast optical signal 19 or the equivalent narrowcast optical signal 32. Other narrowcast signal frequency bandwidths may be used. While FIG. 6 shows the narrowcast signal frequency band as being higher in frequency than the broadcast signal frequency band, the narrowcast signal frequency band may be lower in frequency than the broadcast signal frequency band. While FIG. 6 shows the narrowcast and broadcast signal frequency bands as being non-overlapping, the narrowcast and broadcast signal frequency bands may overlap under conditions to be discussed infra.

Figure 7:
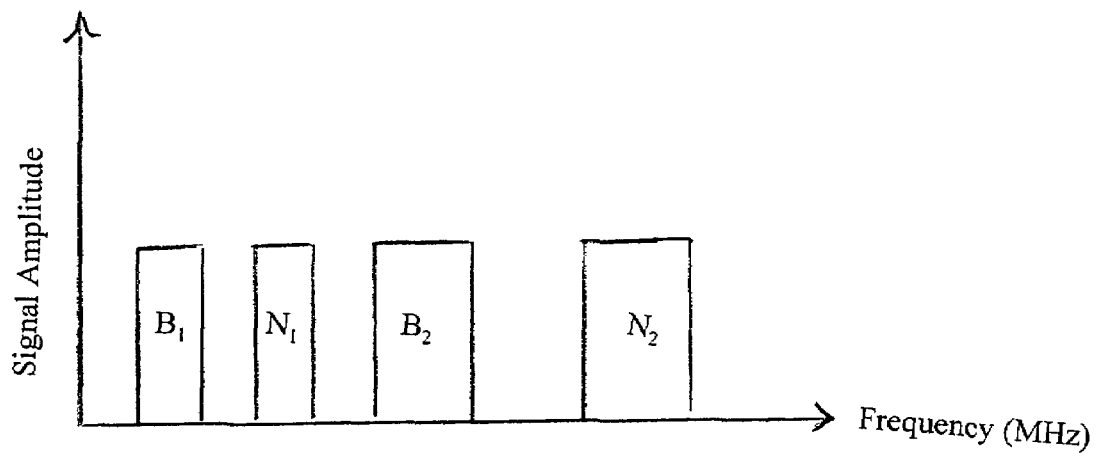
FIG. 7 depicts distributed broadcast signal frequency bands and distributed narrowcast signal frequency bands, in accordance with embodiments of the present invention.

While FIG. 6 shows one contiguous broadcast signal frequency band for the broadcast optical signal 13 of FIG. 1, and one contiguous narrowcast signal frequency band for the narrowcast optical signal 19 of FIG. 1, the narrowcast and broadcast signal frequency bands may each be distributed as shown in FIG. 7. A broadcast signal frequency band is distributed if the frequencies included therein are non-contiguous. A narrowcast signal frequency band is distributed if the frequencies included therein are non-contiguous. FIG. 7 depicts distributed broadcast signal frequency bands $B_1$ and $B_2$, and distributed narrowcast signal frequency bands $N_1$ and $N_2$, in accordance with embodiments of the present invention. While FIG. 7 shows two non-contiguous broadcast signal frequency bands $B_1$ and $B_2$ associated with the broadcast optical signal 13 of FIG. 1, the broadcast optical signal 13 of FIG. 1 may include any number of such non-contiguous broadcast signal frequency bands. While FIG. 7 shows two non-contiguous narrowcast signal frequency bands $N_1$ and $N_2$ associated with the narrowcast optical signal 19 of FIG. 1, the narrowcast optical signal 19 of FIG. 1 may include any number of such noncontiguous narrowcast signal frequency bands.

Figure 2:
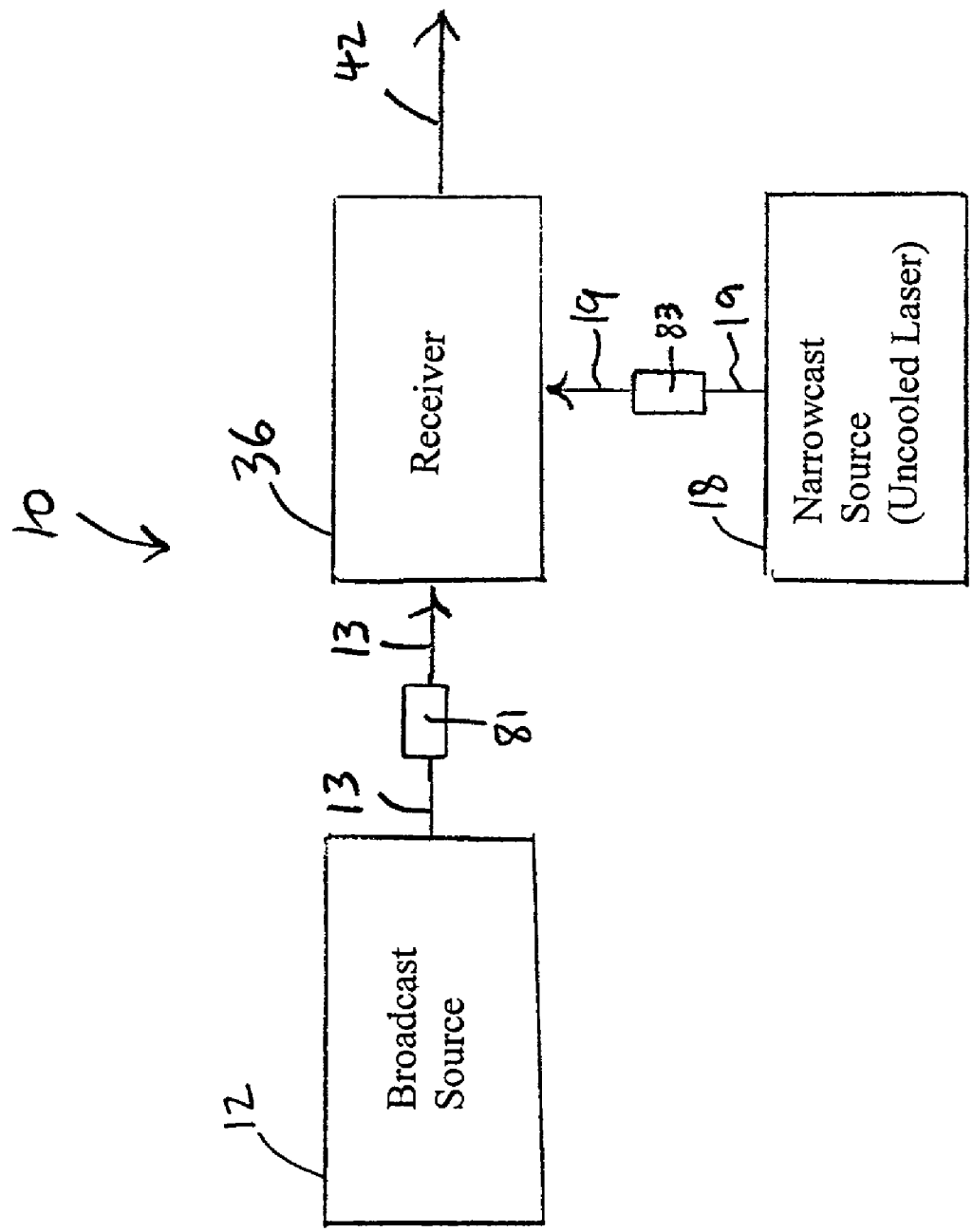
FIG. 2 is a block diagram of a cable television (CATV) distribution system that includes generation of a narrowcast signal by an uncooled laser, in accordance with embodiments of the present invention.

A separate broadcast receiver 34 and narrowcast receiver 35 of FIG. 1 is generally needed because the narrowcast frequency band is seen by the broadcast receiver 34 as frequency distortion. Thus, if distortions caused by the broadcast optical signal 13 of FIG. 1 is not adversely impacted by distortions relating to the narrowcast optical signal 19, then the broadcast receiver 34 and narrowcast receiver 35 of FIG. 1 may be replaced by one receiver 36 as is shown in FIG. 2. In FIG. 2, the optical coupler 16, the optical demultiplexer 30, and the electrical coupler 40 of FIG. 1 are unnecessary and do not appear. Additionally, the narrowcast optical signal 19 may be transmitted through an optical network 83 from the narrowcast source 18 to the one receiver 36, and the optical network 83 is similar to the optical network 81 described supra in conjunction with FIG. 1.

In FIG. 2, the receiver 36 receives the broadcast optical signal 13 and the narrowcast optical signal 19 as input, and generates the composite electrical signal 42 as output. As an example, the CATV distribution system 10 of FIG. 2 is applicable if the broadcast receiver 34 is not adversely impacted by the narrowcast optical signal 19 with respect to: carrier to noise ratio (CNR); composite second order distortion (CSO); and composite triple beat (CTB). Note that the uncooled laser is a nonlinear device that may generate narrowcast distortion signals having such second-order frequency distortion and third-order frequency distortion. As another example, the CATV distribution system 10 of FIG. 2 is applicable, if the bandwidth $\Delta F_N$ of the narrowcast optical signal 19 is less than the lowest frequency $F_{B1}$ of the broadcast optical signal 13. If $\Delta F_N < F_{B1}$, then frequency distortion caused by the narrowcast optical signal 19 is outside the bandwidth of the broadcast optical signal 13 and does not distort the broadcast optical signal 13. Thus, if the broadcast optical signal 13 has a frequency band of 50 to 550 MHZ and the narrowcast optical signal 19 has a frequency band of 570 to 610 MHZ, then $\Delta F_N = 40$ MHZ and $F_{B1} = 50$ MHZ. Since $\Delta F_N < F_{B1}$, the one receiver 36 of FIG. 2 may be used instead of the broadcast receiver 34 and narrowcast receiver 35 of FIG. 1.

In contrast, if the broadcast optical signal 13 has a frequency band of 50 to 550 MHZ and the narrowcast optical signal 19 has a frequency band of 550 to 860 MHZ, then $\Delta F_N = 310$ MHZ and $F_{B1} = 50$ MHZ. Since $\Delta F_N$ is within the bandwidth of the broadcast optical signal 13, second-order frequency distortion (CSO) and third-order frequency distortion (CTB) caused by the narrowcast optical signal 19 is within the bandwidth of the broadcast optical signal 13. As a result, use of the one receiver 36 of FIG. 2 would be inappropriate unless the CSO and CTB distortion could be prevented or eliminated. Fortunately, the CSO and CTB distortion may be prevented or eliminated through use of a linearization circuit, as discussed next.

Figure 3:
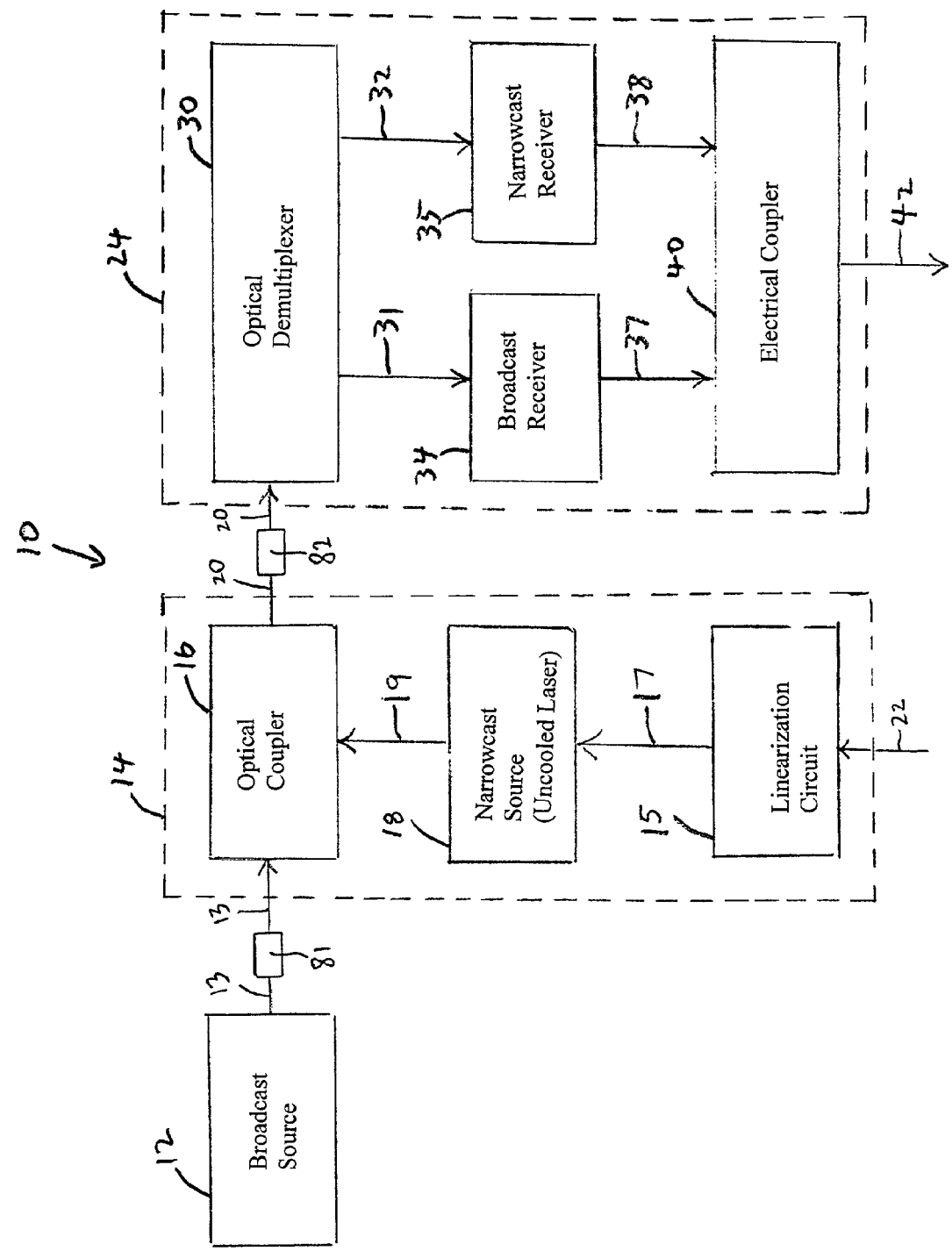
FIG. 3 depicts FIG. 1 wherein frequency distortion within the generated narrowcast signal is reduced or eliminated by a linearization circuit, in accordance with embodiments of the present invention.

FIG. 3 depicts FIG. 1 wherein frequency distortion within the narrowcast optical signal 19 is removed or substantially reduced by a linearization circuit 15, in accordance with embodiments of the present invention. In FIG. 3, the linearization circuit 15 transforms a radiofrequency (RF) signal 22 into a signal 17 which is used by the uncooled laser of the narrowcast source 18 to generate the narrowcast optical signal 19 in which narrowcast distortion has been reduced to within a noise level tolerance of the broadcast optical signal 13. The noise level tolerance is application dependent and may be expressed, inter alia, as having the carrier to noise ratio (CNR) not reduced by more than K decibels, wherein K is application dependent and may have values such as, inter alia, 0.5.

In FIG. 3, the narrowcast optical signal 19 is combined with the broadcast optical signal 13 by the optical coupler 16 to form the composite optical signal 20. Alternatively, since the linearization circuit 15 removes or substantially reduces the frequency distortion, the narrowcast optical signal 19 in FIG. 3 may be combined with the broadcast optical signal 13 by a single receiver similar to the one receiver 36 of FIG. 2. Such a single receiver in FIG. 3 would replace the broadcast receiver 34 and narrowcast receiver 35, and also eliminate the optical coupler 16, the optical demultiplexer 30, and the electrical coupler 40.

Figure 4:
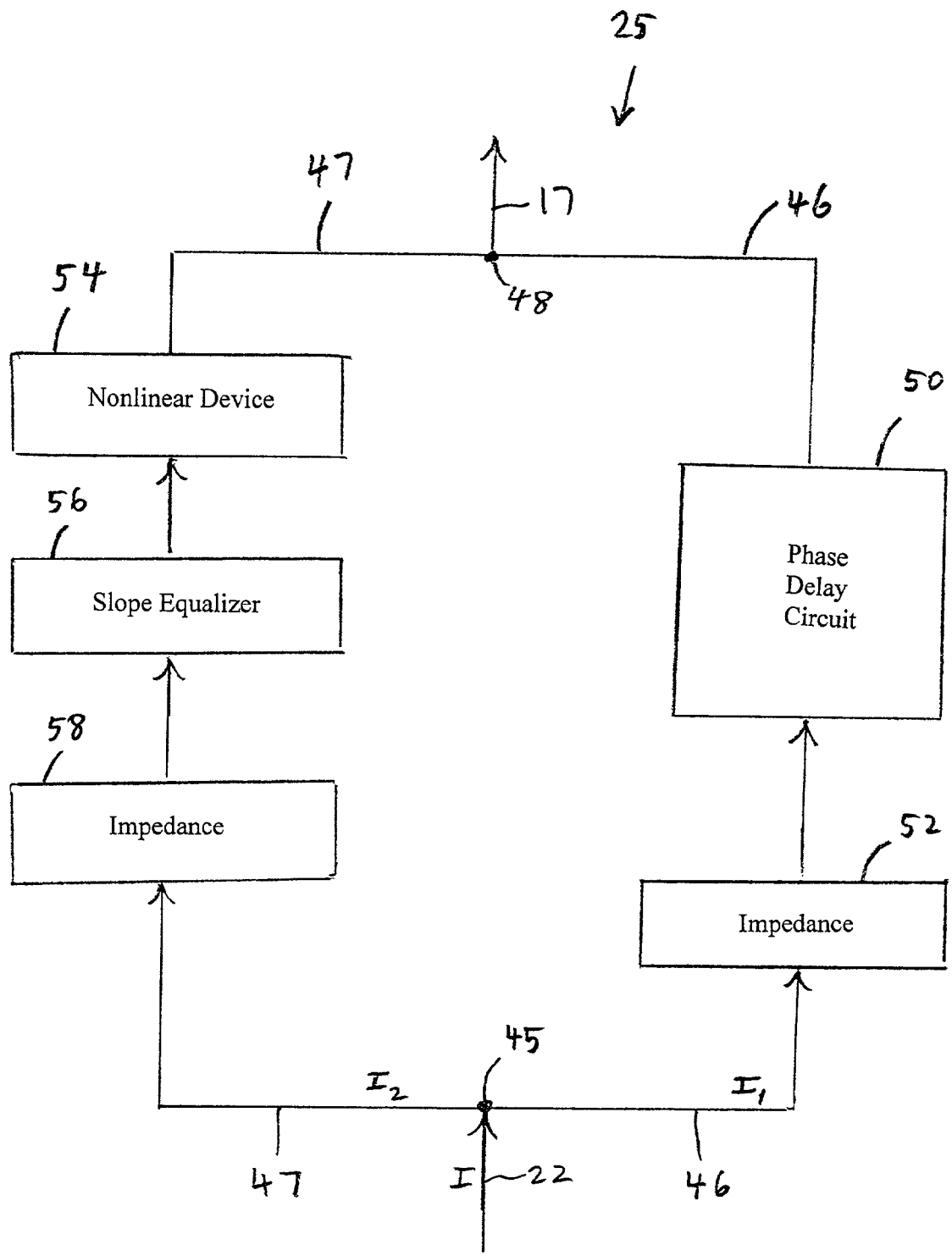
FIG. 4 depicts an embodiment of the linearization circuit of FIG. 3.

FIG. 4 depicts a linearization circuit 25, which is an embodiment of the linearization circuit 15 of FIG. 3. In FIG. 4, a radiofrequency (RF) signal 22 enters a circuit node 45 of the linearization circuit 25 as an electrical current (I), wherein a first portion ($I_1$) of the electric current I flows into a circuit path 46 and a remaining portion ($I_2 = I - I_1$) of the electric current I flows into a circuit path 47. Currents $I_1$ and $I_2$ rejoin at a circuit node 48 and said rejoined electrical current is then converted to the signal 17 which is used by the uncooled laser of the narrowcast source 18 to generate the narrowcast optical signal 19 (see FIG. 3). In FIG. 4, the circuit path 46 includes a phase delay circuit 50 whose function is to shift the phase of $I_1$ by 180 degrees relative to the phase of $I_2$. The circuit path 47 includes a non-linear device 54 such as, inter alia, a diode whose purpose is to generate second-order distortion $\delta^2(I_2)$ and third-order distortion $\delta^3(I_2)$ in $I_2$ of about the same magnitude as the corresponding second-order distortion $\delta^2(I_1)$ and third-order distortion $\delta^3(I_1)$ in $I_1$ that had been generated by the uncooled laser of the narrowcast source 18 of FIG. 3. At least one of impedances 58 and 52 may be present, as shown in FIG. 4, in order to adjust the distortion amplitudes such that $\delta^2(I_2)$ and $\delta^2(I_1)$ are about equal in magnitude and such that $\delta^3(I_2)$ and $\delta^3(I_1)$ are about equal in magnitude, so that, in light of the phase shift in $I_1$ of 180 degrees, $\delta^2(I_2)$ and $\delta^2(I_1)$ will cancel each other and $\delta^3(I_2)$ and $\delta^3(I_1)$ will also cancel each other. Although such cancellation of distortion is easy to accomplish at one frequency, the slope equalizer 56 is present in the circuit path 46 to effectuate such cancellation over all frequencies of the narrowcast optical signal 19 that have second and third harmonics within the bandwidth of the broadcast optical signal 13. The slope equalizer 56 accomplishes a variable phase adjustment in $I_2$ as a function of frequency. If the slope equalizer 56 cannot accomplish perfect cancellation of distortions at all such relevant frequencies, then the slope equalizer 56 could be used to effectuate optimal distortion cancellation for those frequencies at which the distortion is most adverse. Given FIG. 4, which teaches the linearization circuit 25, one of ordinary skill in the art could construct and implement the linearization circuit 25 without undue experimentation. The linearization circuit 25 of FIG. 4 exemplifies a signal splitting phase shifting (SSPS) circuit.

The narrowcast optical signal 19 may have a bandwidth not exceeding one octave as with the 570 to 870 MHZ band shown in FIG. 6. When the narrowcast optical signal 19 is within one octave, it is easier to accomplish the linearization using the linearization circuits 15 and 25 of FIGS. 3 and 4, respectively. Nonetheless, it is also within the scope of the present invention for the narrowcast optical signal 19 to have a bandwidth that exceeds one octave even if the linearization circuit 15 or 25 is used.

The linearization circuits 15 and 25 of FIGS. 3 and 4, respectively, may be used in conjunction with a contiguous signal frequency band of the broadcast optical signal 13 and the narrowcast optical signal 19 of FIG. 3, such as the contiguous broadcast and narrowcast signal frequency bands shown in FIG. 6. The linearization circuits 15 and 25 of FIGS. 3 and 4, respectively, may also be used in conjunction with non-contiguous signal frequency bands of the broadcast optical signal 13 and the narrowcast optical signal 19 of FIG. 3, such as the noncontiguous broadcast and narrowcast signal frequency bands shown in FIG. 7. With the noncontiguous signal frequency bands, however, pure cancellation of distortion currents in the linearization circuit 25 may not be possible, so that the linearization circuit 25 may be tuned to effectuate optimal distortion cancellation at those frequencies at which the distortion is most adverse as explained supra.

Figure 5:
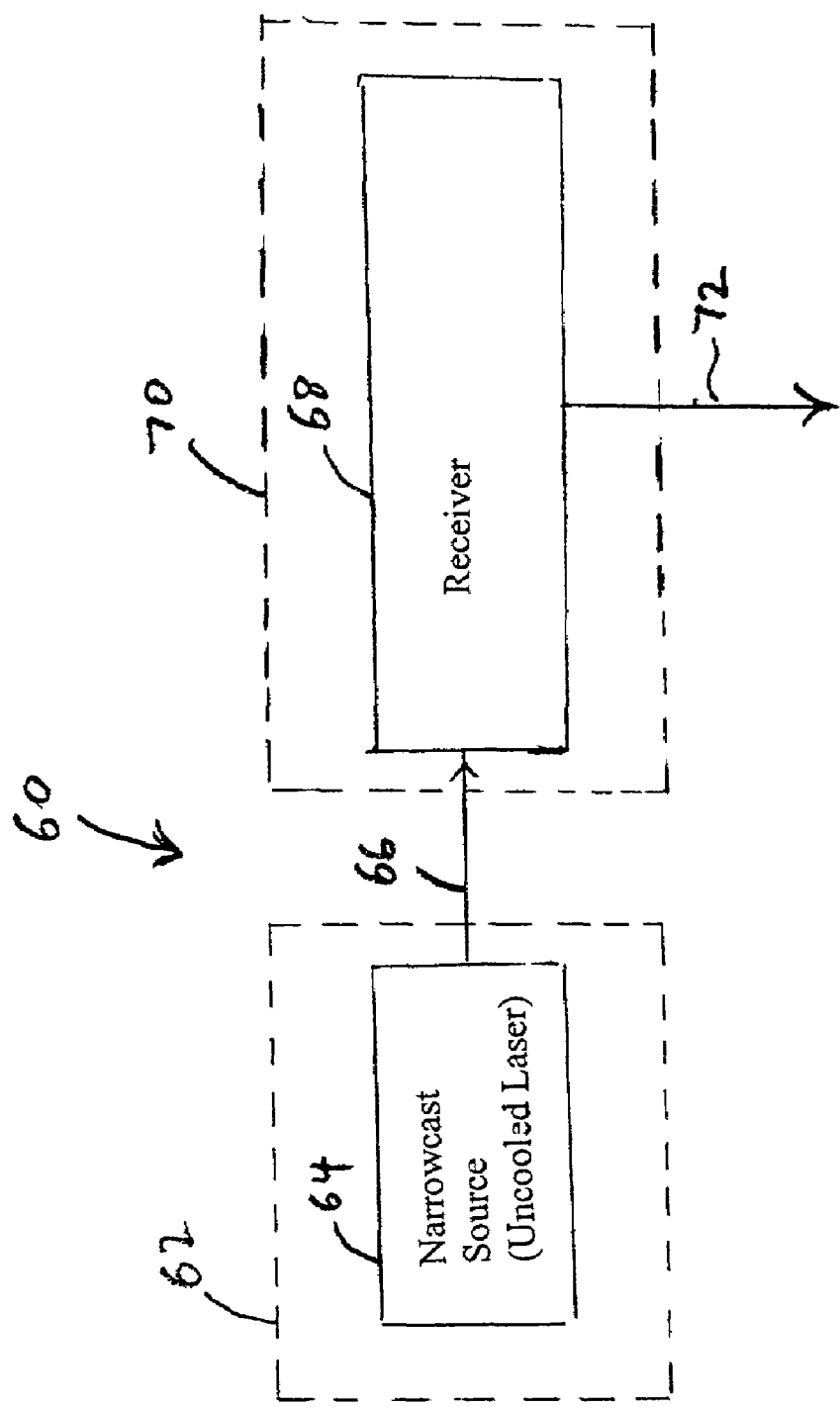
FIG. 5 is a block diagram of a cable television (CATV) distribution system that includes generation of a narrowcast signal by an uncooled laser, in accordance with embodiments of the present invention.

The scope of the present invention includes a narrowcast optical signal generated by an uncooled laser, even if there is no broadcast optical signal present. Accordingly, FIG. 5 depicts a narrowcast optical source 64 which generates a narrowcast optical signal 66, in accordance with embodiments of the present invention. The narrowcast optical source 64 includes an uncooled laser and may exist within, or outside of, a hub 62 of a CATV distribution system 60. The uncooled laser may include, inter alia, a DFB laser or a VCSEL laser. The CATV distribution system 60 also includes a receiver 68 which receives the narrowcast optical signal 66 and converts the narrowcast optical signal 66 into a narrowcast optical signal 72. The receiver 68 may exist within, or outside of, a CATV node 70 of the CATV distribution system 60. The narrowcast optical signal 66 may have any of the features or characteristics discussed supra for the narrowcast optical signal 19 of FIG. 1, such as, inter alia, having a bandwidth not exceeding one octave.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

We claim:

1. A system comprising:
an uncooled laser modulated by a signal from a narrowcast source, the signal from the narrowcast source having a frequency bandwidth of delta-FN, the uncooled laser producing a modulated narrowcast optical signal in response to the signal from the narrowcast source;
a single receiver coupled to receive the narrowcast optical signal from the uncooled laser and to separately receive a broadcast optical signal uncombined with the narrowcast optical signal, the broadcast optical signal having a lowest frequency component of FB1, the single receiver configured to convert the broadcast optical signal and the narrowcast optical signals to a combined electrical output signal; and
wherein FB1 is higher than the value of delta-FN.

2. A apparatus comprising:
an uncooled laser modulated by a linearized signal from a narrowcast source, the uncooled laser producing a modulated narrowcast optical signal in response to the linearized signal from the narrowcast source;
an optical coupler combining an optical broadcast signal from a broadcast source with the narrowcast optical signal;
a linearization circuit coupled to receive a signal from the narrowcast source and to output the linearized signal used to modulate the uncooled laser;
wherein second and third order distortion introduced into the narrowcast optical signal by the uncooled laser appear in a frequency band of the optical broadcast signal; and
the linearization circuit adapted to reduce second and third order distortion introduced into the narrowcast optical signal by the uncooled laser to within a noise level tolerance of the optical broadcast signal.

3. The apparatus of claim 2, wherein the linearization circuit includes a signal splitting phase shifting (SSPS) circuit.

4. A system comprising:
an uncooled laser modulated by a signal from a narrowcast source, the signal from the narrowcast source having a frequency bandwidth of delta-FN, the uncooled laser producing a modulated narrowcast optical signal in response to the signal from the narrowcast source;
an optical broadcast signal from a broadcast source having a lowest frequency component of FB1;
wherein FB1 is higher than the value of delta-FN; and
a single receiver coupled to receive the narrowcast optical signal and the optical broadcast signal, the single receiver configured to convert the optical broadcast and narrowcast optical signals to a combined electrical output.

5. The system of claim 4, wherein the optical broadcast signal is selected from the group consisting of an externally modulated signal, a directly modulated signal, and a signal directly injected into a hub site from a local satellite farm source.

6. The system of claim 4, wherein the narrowcast optical signal and the optical broadcast signal have non-overlapping band widths.

7. The system of claim 4, wherein at least one of the narrowcast optical signal and the optical broadcast signal includes at least two noncontiguous frequency bands.

8. The system of claim 4, wherein a bandwidth of the narrowcast optical signal does not exceed one octave.

* * * * *